INVENTOR
FRIEDRICH LACHNIT
ATTORNY'S

United States Patent Office

3,664,762
Patented May 23, 1972

3,664,762
APPARATUS FOR SUPPLYING PRESSURIZED FLUID TO A ROTATING DEVICE
Friedrich Lachnit, Hamburg, Germany, assignor to Deutsche Babcock & Wilcox Aktiengesellschaft, Oberhausen, Germany
Filed July 20, 1970, Ser. No. 56,376
Claims priority, application Germany, July 30, 1969, P 19 38 596.7
Int. Cl. F01d 25/00; F04d 27/00
U.S. Cl. 416—156
6 Claims

ABSTRACT OF THE DISCLOSURE

An apparatus for supplying pressurized control fluid from a non-rotating member to a rotating device is described. The rotating device is provided with axially concentrically arranged fluid carrying channels separated by annular walls which terminate at an axial end of the device. The non-rotating member is provided with axially concentric channels separated by annular walls which terminate at an axial end in abutment with the walls in the rotating device. An axial pressurized device is employed to maintain the non-rotating and rotating walls in axial abutment to form high quality seals capable of carrying fluid pressures measured in hundreds of atmospheres.

BACKGROUND AND SUMMARY OF THE INVENTION

This invention relates to an apparatus for supplying pressurized control fluid to a rotating device. More particularly this invention relates to an apparatus for supplying control fluid at high pressures to a rotating device with excellent sealing between fluid carrying channels at the interface between the rotating device and a stationary control fluid supplying member.

In an apparatus for supplying pressurized control fluid to a rotating device in accordance with the invention the rotating device which rotates about an axis, axially abuts a stationary control fluid supply member. Both the rotating device and the stationary member are provided with annular radially concentric fluid carrying channels separated by annular concentric walls. The walls of the rotating device and the stationary member axially abut to form annular seals each of which is located in a plane that is transverse to the axis of rotation. The rotating device and the stationary member are maintained in axial abutment with an axially directed force such as from a piston-cylinder apparatus or a spring and the like.

A known apparatus for supplying pressurized control fluid to a rotating device utilizes a non-rotating shaft having a number of radially outwardly facing annular grooves. These annular grooves are supplied with control fluid from axial passages in the shaft. The non-rotating shaft fits within a bore of the rotating member and the bore is provided with peripherally located annular grooves which receive pressurized control fluid from the annular grooves in the shaft for transmittal to devices to be controlled. This known apparatus is characterized by its disadvantages with respect to the performance and reliability of perimeter seals between the non-rotating shaft and the rotating device. These perimeter seals commonly are formed of flexible gaskets having limited sealing capability with pressure differentials across the seals generally limited from 6 to about 10 atmospheres (gauge pressure).

Furthermore, in the structure of such prior art apparatus the stationary shaft tends towards relatively large diameters to accommodate multiple axial bores with the result that the gasket seals are subjected to high perimeter speeds. The gaskets fit circumferentially around the stationary shaft and have an axial width commensurate with pressure differentials between adjacent grooves. As a result the gaskets are large and must be accurately made to serve their sealing function.

In an apparatus for fluid communication with a rotary device in accordance with the invention, the sealing function is performed with annular walls each located in a vertical plane to provide an axial sealing abutment capable of high pressure sealing with gauges pressures as high as from 120 to 300 atmospheres. The axial seals are reliable with long operating lives and maintain a high degree of operational safety.

The high fluid pressures usable in an apparatus of this invention advantageously enable the transmission of large forces such as for instance used to adjust the attack angle of blades in axial blowers used in power stations.

The described prior art radially sealing apparatuses for supplying control fluid to rotating devices do not lend themselves easily to control of the sealing pressure of the circumferential seals. Circumferential slip ring seals with contact pressures from springs or liquid actuated membranes do not provide sufficiently precise sealing as needed for high precision fluid control of rotary devices with high fluid pressures.

In an apparatus in accordance with the invention high pressure control fluid is supplied to a rotating device while the sealing pressure between axially abutting walls is advantageously controlled. The radial width of abutting concentric walls may be selected commensurate with the high fluid pressures encountered in the annular channels. With the pressures fluctuating within the annular channels between ratios of 1 to 10 and 1 to 50, the axial sealing pressure as well as the radial widths of the annular axially abutting walls are advantageously selected to reduce wear on the sealing surfaces with a minimum of leakage past the axial seals. The axially sealing wall surfaces are sized with regards to adjacent annular channel cross-sections. The radial sealing width of the annular sealing walls may be selected to enable a constant axial pressure to maintain a high quality seal between the abutting walls while the fluid pressure in adjoining channels is varied.

The axial length of an apparatus of this invention is made independent of the number of fluid carrying circumferential channels, thus providing an axially compact apparatus for supplying pressurized fluid to a rotary device.

The employment of hydraulic control fluid having lubricating characteristics advantageously introduces a thin lubricating film between axially abutting concentric walls in an apparatus of this invention. The rotary contact with the rotating device is thus maintained with low friction even while the annular channels carry high pressure fluid. The resulting structure is economic and exhibits little wear over long duration operations.

BRIEF DESCRIPTION OF DRAWINGS

These advantages and others of an apparatus in accordance with the invention will be understood from the following description of an embodiment in conjunction with the drawings wherein.

DETAILED DESCRIPTION OF EMBODIMENT

Figure 1:
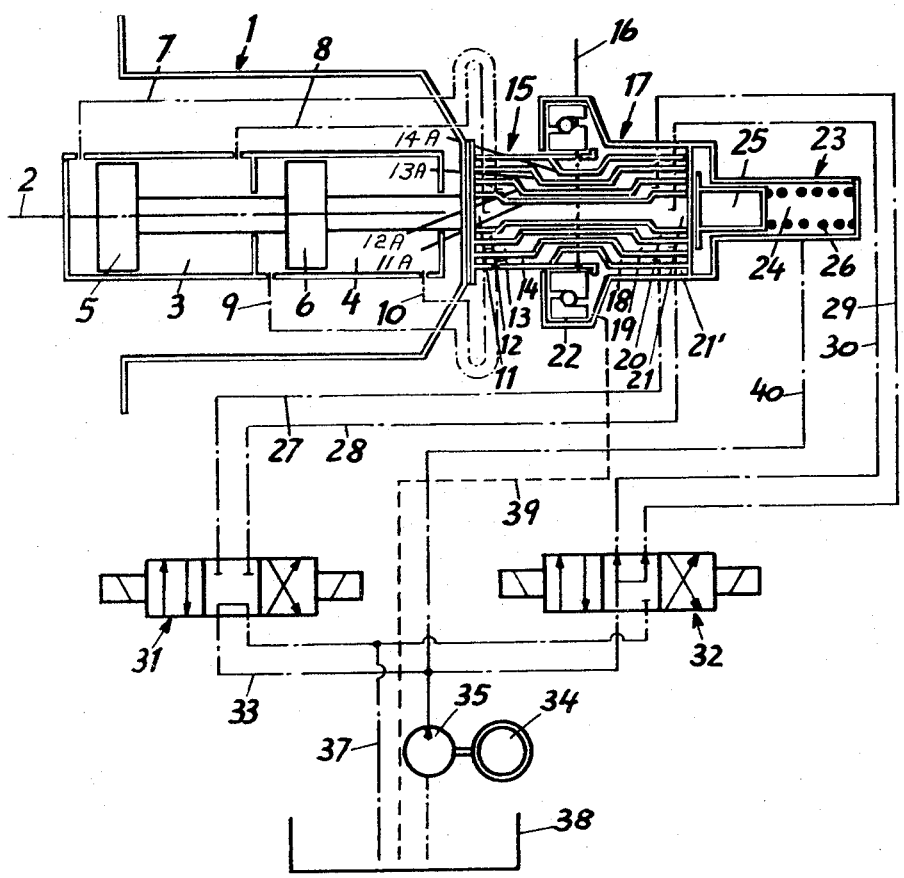
FIG. 1 is a crosssectional schematic representation of an apparatus for supplying fluid for control of a rotating device in accordance with the invention.

With reference to FIG. 1, a rotating device 1 is shown for controlling for instance the angle of attack of blades employed in an axial blower (not shown). The rotating device 1 rotates about an axis 2 and includes a pair of axially coupled cylinders 3 and 4 provided with a hydraulically controlled mechanical locking piston 5 and a normal piston 6 respectively. Axial movement of piston 6 causes a change in the angle of attack of the blades (not shown) in the axial blower.

Cylinders 3 and 4 are coupled with suitable control fluid carrying lines to concentric fluid carrying channels. Cylinder 3 is coupled by fluid lines 7 and 8 to channels 11 and 12 respectively and cylinder 4 is coupled by fluid lines 9 and 10 to channels 13 and 14 respectively. Channels 11, 12, 13 and 14 are concentrically located with respect to each other and the axis of rotation 2 in rotating element 15 supported by rotating device 1. The channels 11 through 14 are separated by annular walls 11A, 12A, 13A and 14A which terminates at an axial end of element 15 in a common plane 16.

Figure 2:
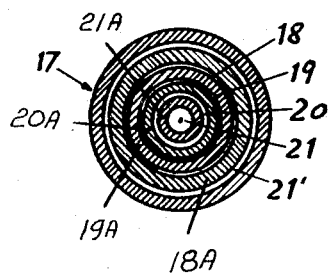
FIG. 2 is a radial section view of stationary annular and concentric walls and channels employed in the apparatus of FIG. 1.

The rotating element 15 axially abuts a stationary or non-rotating member 17 in the plane 16. Member 17 is provided with four stationary concentrically arranged channels 18, 19, 20 and 21 separated by annular walls 18A, 19A, 20A and 21A (see FIG. 2) which terminate at one axial end of the member 17. Non-rotating walls 18A through 21A abut rotating walls 14A, 13A, 12A and 11A respectively in plane 16 which is transverse to the axis of rotation 2. The cross-sections of pairs of abutting walls are the same along plane 16 to form continuous fluid flow passages between axially aligned concentric channels. Different pairs of abutting walls may be of different radial widths to provide correspondingly varying axial seals between the channels. The non-rotating member 17 and the rotating element 15 are retained in axial alignment by a ball bearing 22. Ball bearing 22 is exposed to an annular fluid collecting leakage channel 21' located around the non-rotating member 17.

Stationary member 17 is axially pressed onto the rotating element 15 by means of a pressurizing device 23 so that the concentric rotating and non-rotating walls axially abut with sufficient pressure in sealed relationship with one another. Pressurizing device 23 is formed of a piston 25 operative against member 17 and is located in a cylinder 24. Piston 25 is subjected to a minimum spring bias to form a spring 26 to maintain a minimum axial sealing pressure between abutting walls. This minimum axial sealing pressure advantageously prevents separation of axially abutting sealing surfaces because of the weight of element 17 (for a vertical orientation) or due to transverse acceleration forces from imbalances.

The stationary concentric channels 18 through 21 are connected to control valves 31 and 32 through fluid lines 27–28 and 29–30 respectively. Valves 31 and 32 are supplied with hydraulic fluid through line 33 from a pump 35 driven by a motor 34. A hydraulic fluid return line 37 couples valves 31 and 32 to a collection tank 38. A fluid line 39 couples the fluid leakage collecting channel 21' with collection tank 38. A fluid line 40 couples the fluid from pump 35 directly to the cylinder 24 in axial pressurizing device 23.

In the operation of the apparatus the fluid carrying channels may be provided with fluid pressure from the valves 31 and 32 wherein stationary channels 20 and 21 (with rotating channels 12 and 11 respectively) provide a release of the mechanical lock on the blades of the axial blower with piston 5. Stationary channels 18 and 19 (with rotating channels 14 and 13 respectively) produce a lock of the blades. Stationary channels 19 through 21 (with rotating channels 13 through 11 respectively) control an extension of the blades and stationary channels 18 and 20 (with rotating channels 14 and 12 respectively) control a retraction of the blades. Hence, the hydraulic pressure in lines 7 and 8 and 9 and 10 may be varied in selected combinations to produce a desired control of the motion of pistons 5 and 6 as required for the rotating device.

Having thus described an apparatus for supplying pressurized control fluid to a rotating device the features and advantages may be appreciated. Variations of the described embodiment may be contemplated within the scope of the following claims.

What is claimed is:

1. An apparatus for supplying pressurized control fluid to a rotating device from a source of pressurized fluid comprising, a rotating device mounted to rotate about an axis of rotation, said rotating device being provided with fluid control channels terminating at an axial end of the rotating device and concentrically located with respect to one another and the axis of rotation, a non-rotating member aligned with the axis of rotation of the rotating device, said non-rotating member being provided with concentrically located fluid control channels terminating at an axial end of the member, with said one member axial end aligned with the one axial end of the rotating device to place respective concentric fluid control channels in axial communication with one another, means for maintaining said one axial ends of the rotating device and the non-rotating member in axial abutment with one another to form rotatable axially abutting seals between the rotating device and the non-rotating member, said means including a cylinder and a piston axially operatively aligned along the axis of rotation to axially press the one end of the non-rotating member to the one end of the rotating device, and means to activate the cylinder and piston, and means for selectively coupling the fluid control channels in the non-rotating member with the source of pressurized fluid source for fluid control.

2. The apparatus as claimed in claim 1 wherein the piston operatively axially presses the non-rotating member to the rotating device and spring means to provide a minimum spring bias of the piston onto the non-rotating member.

3. An apparatus for supplying pressurized control fluid to a rotating device from a source of pressurized fluid comprising, a rotating device mounted to rotate about an axis of rotation, said rotating device being provided with fluid control channels separated by radially spaced annular walls and terminating at an axial end of the rotating device and concentrically located with respect to one another and the axis of rotation, a non-rotating member aligned with the axis of rotation of the rotating device, said non-rotating member being provided with concentrically located fluid control channels separated by radially spaced annular walls and terminating at an axial end of the member, with said one member axial end aligned with the one axial end of the rotating device to place respective concentric fluid control channels in axial communication with one another.

means for maintaining said axial ends of the rotating device and the non-rotating member in axial abutment with one another with axial abutment pressure to cause respective radially spaced annular walls to axially abut corresponding radially spaced walls forming rotatable high pressure axially abutting concentric annular seals between radially adjacent channels of the rotating device and the non-rotating member, means for selectively coupling the fluid control channels in the non-rotating member with the source of pressurized fluid source for fluid control.

4. The apparatus as claimed in claim 3 and further including a ball bearing retaining the rotating device and the non-rotating member in axial alignment, said ball bearing being exposed to an annular fluid collecting channel for collecting leakage fluid from the region surrounding the abutment of the rotating device and non-rotating member.

5. The apparatus as claimed in claim 3 wherein the fluid control channels in said one axial ends of the rotating device and the non-rotating member terminate in a common plane which is transverse to the axis of rotation.

6. The apparatus as claimed in claim 3 wherein the radial widths of said axially abutting walls are selected commensurate with pressure differentials in radially adjacent channels separated by said walls to provide high quality sealing between concentric channels with constant axial abutment pressure from said means for maintaining the rotating device and non-rotating member in axial sealing relationship.

References Cited

UNITED STATES PATENTS 3,459,267  8/1969  Chilman _____ 416—157

FOREIGN PATENTS 1,283,196  12/1961  France _____ 416—156

HENRY F. RADUAZO, Primary Examiner

U.S. Cl. X.R.

415—148